United States Patent
Bahn

[19]
[11] Patent Number: 5,828,154
[45] Date of Patent: Oct. 27, 1998

[54] RELUCTANCE MOTOR

[75] Inventor: Itsuki Bahn, Nerima-ku, Japan

[73] Assignee: Kabushikigaisha Sekogiken, Tokyo, Japan

[21] Appl. No.: 809,891

[22] PCT Filed: Jul. 25, 1996

[86] PCT No.: PCT/JP96/02096

§ 371 Date: Mar. 31, 1997

§ 102(e) Date: Mar. 31, 1997

[87] PCT Pub. No.: WO97/05692

PCT Pub. Date: Feb. 13, 1997

[30] Foreign Application Priority Data

Aug. 1, 1995 [JP] Japan ................................. 7-225661

[51] Int. Cl.$^6$ .......................... H02K 19/00; H02K 11/00; H02P 7/05

[52] U.S. Cl. ....................... 310/168; 310/261; 310/68 R; 310/162

[58] Field of Search ................................. 310/168, 216, 310/261, 162, 68 R; 318/138, 166, 254, 696

[56] References Cited

U.S. PATENT DOCUMENTS

| 3,956,678 | 5/1976 | Byrne et al. | 310/168 |
|---|---|---|---|
| 4,143,308 | 3/1979 | Deplante et al. | 318/138 |
| 4,763,056 | 8/1988 | Byrne et al. | 318/701 |
| 5,012,172 | 4/1991 | Sember | 318/696 |
| 5,239,217 | 8/1993 | Horst | 310/51 |

FOREIGN PATENT DOCUMENTS

| 5-207784 | 8/1993 | Japan . |
|---|---|---|
| 5-244795 | 9/1993 | Japan . |
| 5-308795 | 11/1993 | Japan . |
| 6-038487 | 2/1994 | Japan . |
| 6-062551 | 3/1994 | Japan . |
| 7-039191 | 2/1995 | Japan . |
| 7-046808 | 2/1995 | Japan . |
| 7-046809 | 2/1995 | Japan . |
| 7-075310 | 3/1995 | Japan . |
| 7-194178 | 7/1995 | Japan . |
| 7-312896 | 11/1995 | Japan . |
| 8-037791 | 2/1996 | Japan . |

Primary Examiner—Thomas M. Dougherty
Assistant Examiner—Tran N. Nguyen
Attorney, Agent, or Firm—Staas & Halsey

[57] ABSTRACT

A magnetic rotor (5) is provided inside a stator armature (1) of a reluctance motor with an air gap between them. Two salient poles (5a, 5b), each having a width that is 2.5 times each of angular intervals among adjacent slots (1a, 1b, ..., 1h) of the stator armature (1), are arranged on the outer peripheral portion of the rotor (5). Magnetic fluxes generated by energizing armature coils (2h, 2d) of magnetic poles (4h, 4d) that are not situated at positions where torque is produced are added to magnetic fluxes generated by energizing armature coils (2a, 2e) of magnetic poles (4a. 4e) that are situated at-positions where torque is produced in a direction indicated by arrow R. As a result, leakage fluxes Fa, Fb between the magnetic poles (4a, 4e) and the salients (5a, 5b) of the rotor (5) increase, causing the torque to increase.

2 Claims, 7 Drawing Sheets

RELUCTANCE MOTOR

TECHNICAL FIELD

The present invention relates to a reluctance motor used as a drive source for the axes of rotation of machine tools, compressors, electric vehicles, etc., and more particularly, to a reluctance motor with increased torque.

BACKGROUND ART

In a reluctance motor, magnetic poles are formed by winding armature coils in slots that are arranged in the inner peripheral surface of a stator armature, while salient poles are arranged on the outer peripheral surface of a rotor. The magnetic poles are excited with the salient poles and the inner peripheral surface of the stator armature facing one another across narrow gaps, with the result that leakage fluxes are generated between the magnetic poles and the salient poles, thereby causing a torque to be developed.

In order to increase this torque, therefore, it may be necessary (a) to increase the leakage fluxes to be generated between the magnetic poles and the salient poles or (b) to reduce as far as possible the air gap between the salient poles and the inner peripheral surface of the stator armature. In the case (a), the capacity of the armature coils wound in the slots of the stator armature must be increased. However, as the increase in capacity of the armature coils results in increase in size of the reluctance motor, the increase in torque based on the increase in leakage fluxes has its limit. In the case (b), on the other hand, as not only the machining accuracy must be improved but also the magnetic poles and the salient poles may come into contact with one another even with a small wear of a bearing for holding the rotor, increasing the torque by reducing the air gap has also its limit.

DISCLOSURE OF THE INVENTION

The object of the present invention is to provide a reluctance motor capable of increasing its torque by increasing leakage fluxes between magnetic poles formed on a stator armature and salient poles formed on a rotor, without increasing the size of a motor by increasing the capacity of armature coils which form magnetic poles, or without improving machining accuracy in order to minimize the size of gaps between the salient poles and the inner peripheral surface of the stator armature.

In order to achieve the above object, a reluctance motor according to the present invention comprises: a magnetic stator armature formed with 8n units (n is an integer of 1 or more) of slots arranged in the inner peripheral surface thereof at regular angular intervals of 90 degrees in terms of electrical angles; 8n units of magnetic poles formed by winding armature coils individually between the adjacent, slots in said magnetic stator armature; a magnetic rotor formed with 2n units of salient poles arranged on the outer peripheral surface thereof and having a width ranging from an electrical angle of 180 degrees to 270 degrees and at intervals ranging from electrical angles of 90 degrees to 180 degrees; means for holding said magnetic rotor relatively to said stator armature so that the respective outer peripheral surfaces of the 2n units of salient poles of said magnetic rotor and the inner peripheral surface of said stator armature confront one another across narrow air gaps; rotational position detecting means for detecting the respective rotational positions of the salient poles of the rotor with respect to each slot of said stator armature; a power-supply signal generator for generating 4n sets of phase power-supply signals based on rotational position signals from said rotational position. detecting means so that power-supply signals in one phase overlap power-supply signals in another phase by electrical angles of 90°; 4n units of phase exciting coils formed by connecting the armature coils of each two diametrically opposite salient poles, out of said 8n units of salient poles, in series or parallel with each other; and a power-supply control circuit designed so that semiconductor switching elements are connected individually in series with said 4n units of phase exciting coils, and that the exciting coils for each. phase are energized one after another by turning on the semiconductor switching elements corresponding to the exciting coils for the phase concerned by a width equivalent to an electrical angle of 180°, in response to the power-supply signals of each phase delivered from said power-supply signal generator.

In the reluctance motor of the present invention having the aforesaid construction, magnetic fluxes generated by energizing the armature coils of the magnetic poles that are situated at positions where no torque is produced are added to magnetic fluxes generated by energizing the armature coils of the magnetic poles that are situated aft positions where torque is produced, whereby leakage fluxes between the magnetic poles and the salients of the rotor increase, causing the torque to increase.

BEST MODE FOR CARRYING OUT THE INVENTION

Figure 1:
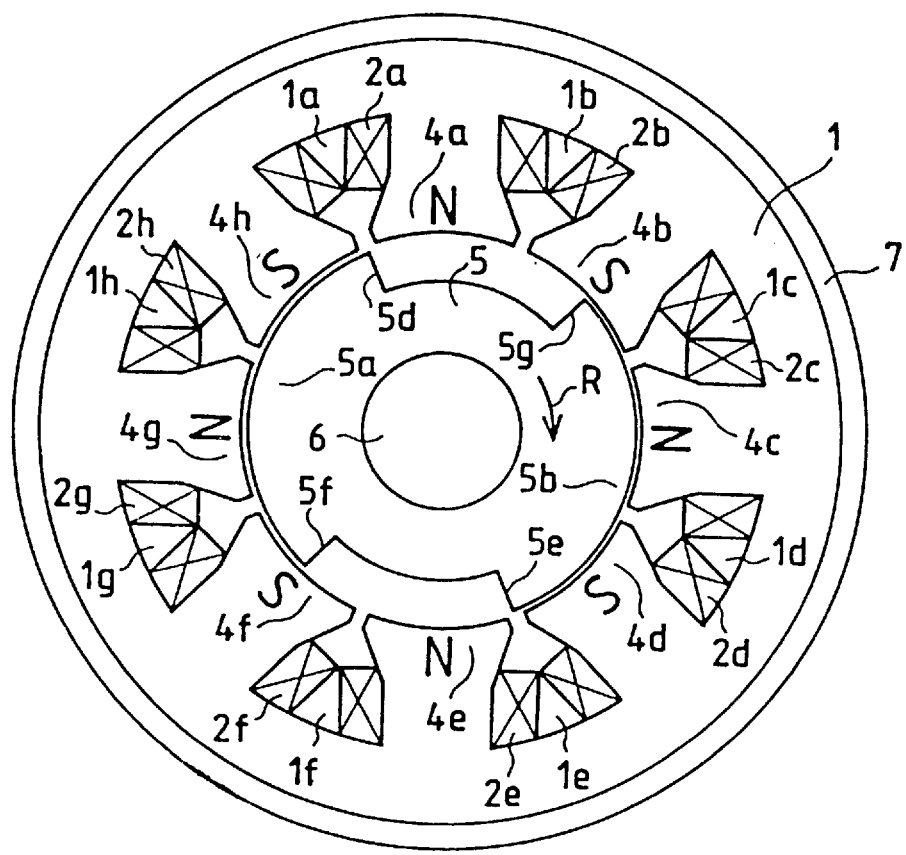
FIG. 1 is a cross-sectional view of one embodiment of a reluctance motor according to the present invention.
Figure 2:
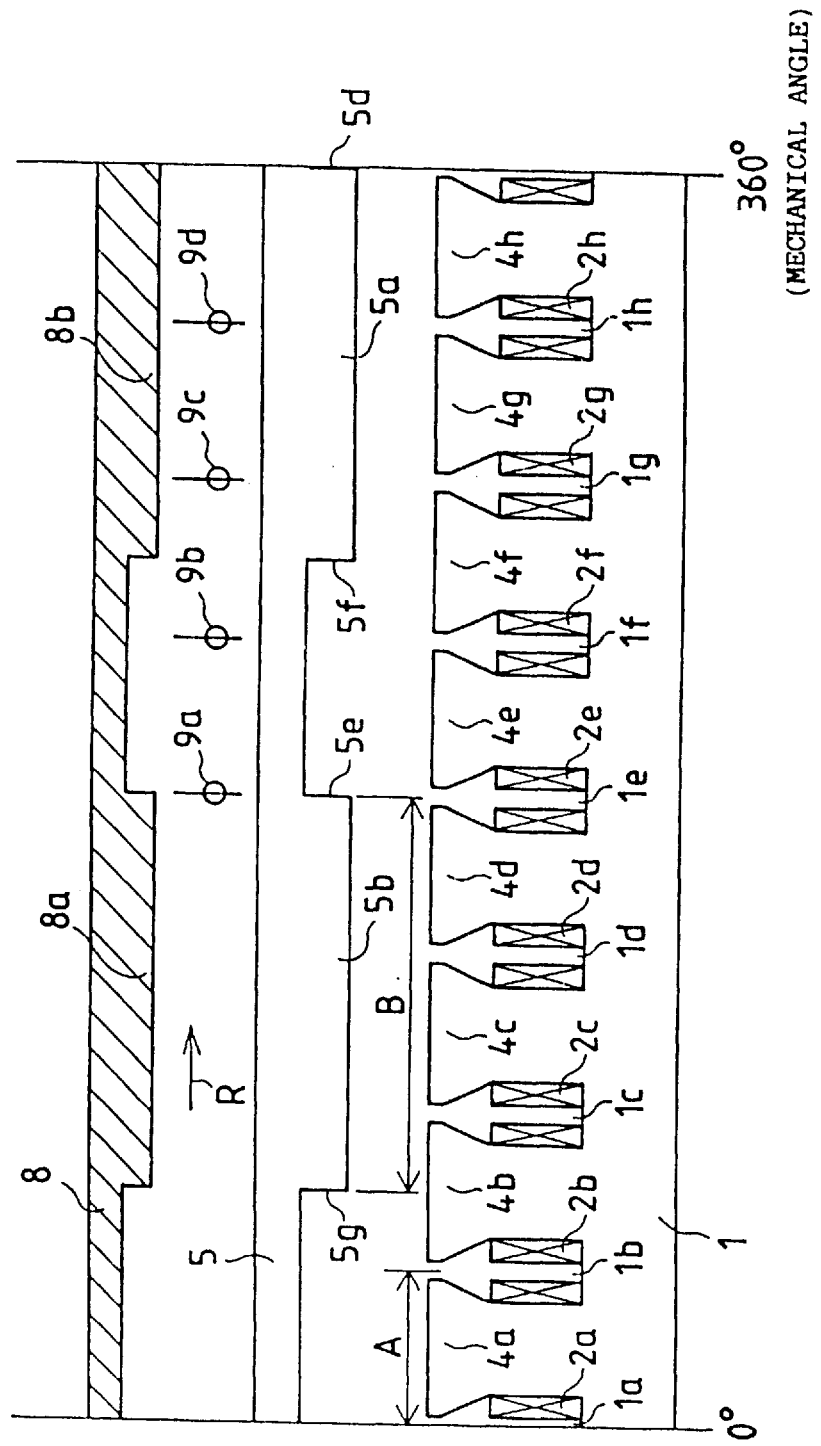
FIG. 2 is a development diagram showing a stator armature, rotor and position detecting rotor of the motor FIG. 1.

Referring to FIGS. 1 and 2, a four-phase reluctance motor according to one embodiment of the present invention will be described.

Eight slots 1a, 1b, 1c, 1d, 1e, 1f, 1g and 1h are formed at regular intervals (having a width indicated by A in FIG. 2; mechanical angle of 45° or electrical angle of 90°) in the circumferential direction along the inner peripheral surface of a cylindrical stator armature 1 that is formed of a magnetic material.

An armature coil 2a is wound between the first slot 1a and the second slot 1b, thus forming a magnetic pole 4a. Also, an armature coil 2e is wound between the fifth slot 1e and the sixth slot 1f, thus forming a magnetic pole 4e. These armature coils 2a and 2e are connected in series and form a first-phase exciting coil 3a (see FIG. 3).

An armature coil 2b is wound between the second slot 1b and the third slot 1c, thus forming a magnetic pole 4b. Also, an armature coil 2f is wound between the sixth slot 1f and the seventh slot 1g, thus forming a magnetic pole 4f. These armature coils 2b and 2f are connected in series and form a second-phase exciting coil 3b.

An armature coil 2c is wound between the third slot 1c and the fourth slot 1d, thus forming a magnetic pole 4c. Also, an armature coil 2g is wound between the seventh slot 1g and the eighth slot 1h, thus forming a magnetic pole 4g. These armature coils 2c and 2g are connected in series and form a third-phase exciting coil 3c.

An armature coil 2d is wound between the fourth slot 1d and the fifth slot 1e, thus forming a magnetic pole 4d. Also, an armature coil 2h is wound between the eighth-slot 1h and the first slot 1a, thus forming a magnetic pole 4h. These armature coils 2d and 2h are connected in series and form a fourth-phase exciting coil 3d.

A magnetic rotor 5 is placed inside the stator armature 1 with an air gap provided therebetween. Two salient poles 5a and 5b, which have a width B (i.e., mechanical angle of 112.5° or electrical angle of 225°) equivalent to 2.5 times the angular interval A between the individual adjacent slots 1a, 1b, 1h of t he stator armature 1, are arranged at regular angular intervals (electrical angles of 135° or mechanical angles of 67.5°) on the outer peripheral portion of the rotor 5. As shown in FIG. 1, the salient pole 5a is defined by end portions 5d and 5f, while the salient pole 5b is defined by end portions 5g and 5e.

A cylindrical frame 7 is fixed to the outer periphery of the stator armature 1. A rotating shaft 6, on which the rotor 5 is fixed, is rotatably supported on brackets (not shown) at the opposite end portions of the frame 7 by means of bearings (not shown).

The individual magnetic poles are given magnetic polarities by energizing the armature coils 2a to 2h so that the diametrically opposite magnetic poles are magnetized so as to have the same polarity (case shown in FIG. 1) or the diametrically opposite magnetic poles are magnetized so as to have different polarities.

Referring now to FIG. 2, there will be described means for detecting the respective rotational positions of the salient poles 5a and 5b of the rotor 5 relative to the slots 1a, 1b, . . . , 1h of the stator armature 1 of the reluctance motor.

A position detecting rotor 8 is fixed to the rotating shaft 6 and close to the rotor 5. Thus, the position detecting rotor 8 and the rotor 5 are rotated integrally by means of the rotating shaft 6, so that the position of the rotor 5 can be identified by detecting the position of the position detecting rotor 8. This position detecting rotor 8 is formed of a metallic conductor such as aluminum, and salients 8a and 8b, each having the same width as those of the salient poles 5a and 5b of the rotor 5 are formed at the same intervals as those between the salient poles 5a and 5b on the outer periphery of the rotor 8. More specifically, the width of each of the salients 8a and 8b of the position detecting rotor 8 is equivalent to an electrical angle of 225° or mechanical angle of 112.5°, while each interval between the salients 8a and 8b is equivalent to an electrical angle of 135° or mechanical angle of 67.5°.

A bracket (not shown) is fixed to the frame 7 of the reluctance motor, and flat small-diameter coils 9a, 9b, 9c and 9d are arranged at angular intervals equivalent to electrical angles of 90° on the bracket, as shown in FIG. 2. These four coils 9a to 9d serve as position detecting elements. The respective surfaces of these coils 9a to 9d face the salients 8a and 8b of the position detecting rotor 8 through an air gap.

Figure 3:
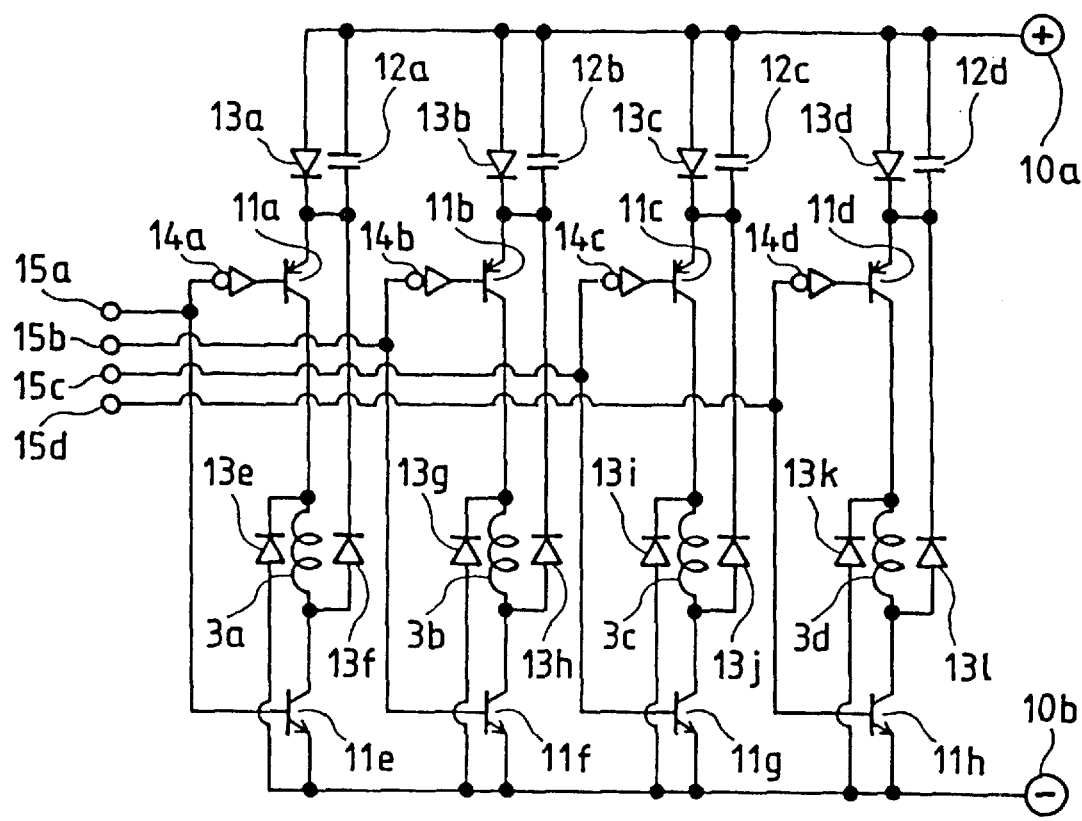
FIG. 3 is a diagram of a power-supply circuit for driving the motor according to the present invention.

Referring now to FIG. 3, there will be described an example of a power-supply control circuit for use as drive means of the four-phase reluctance motor constructed in the aforementioned manner.

In this power-supply control circuit of FIG. 3, first-, second-, third- and fourth-phase exciting coils 3a, 3b, 3c and 3d are connected, respectively, to positive-pole-side switching elements 11a, 11b, 11c and 11d, which are connected in parallel with a positive-pole terminal 10a of a power source (through diodes 13a, 13b, 13c and 13d), and to negative-pole-side switching elements 11e, 11f, 11g and 11f, which are connected in parallel with a negative-pole terminal 10b of the power source.

Capacitors 12a, 12b, 12c and 12d and forward-connected diodes 13a, 13b, 13c and 13d are connected in parallel with one another of the respective positive-pole-side terminals of the positive-pole-side switching elements 11a, 11b, 11c and 11d and the positive-pole terminal 10a of the power source.

Also, a diode 13f is reversely connected between the positive-pole-side terminal of the first positive-pole-side switching element 11a and the junction of the first-phase: exciting coil 3a and the first negative-pole-side switching element 11e. A diode 13h is reversely connected between the positive-pole-side terminal of the second positive-pole-side switching element 11b and the junction of the second-phase exciting coil 3b and the second negative-pole-side switching element 11f. A diode 13j is reversely-connected of the positive-pole-side terminal of the third positive-pole-side switching element 11c and the junction of the third-phase exciting coil 3c and the third negative-pole-side switching element 11g. And a diode 131 is reversely connected between the positive-pole-side terminal of the fourth positive-pole-side switching element 11d and the junction of the fourth-phase exciting coil 3d and the fourth negative-pole-side switching element 11h.

Further, a diode 13e is reversely connected between the negative-pole terminal 10b of the power source and the junction of the first-phase exciting coil 3a and the first positive-pole-side switching element 11a. A diode 13g is reversely connected between the negative-pole terminal 10b of the and the junction of the second-phase exciting coil 3b and the second positive-pole-side switching element 11b. A diode 13i is reversely connected between the negative-pole terminal 10b of the power source and the junction of the third-phase exciting coil 3c and the third positive-pole-side switching element 11c. And a diode 13k is reversely connected between the negative-pole terminal job of the power source and the junction o f the fourth-phrase exciting coil 3d and the fourth positive-pole-side switching element 11d.

Figure 4:
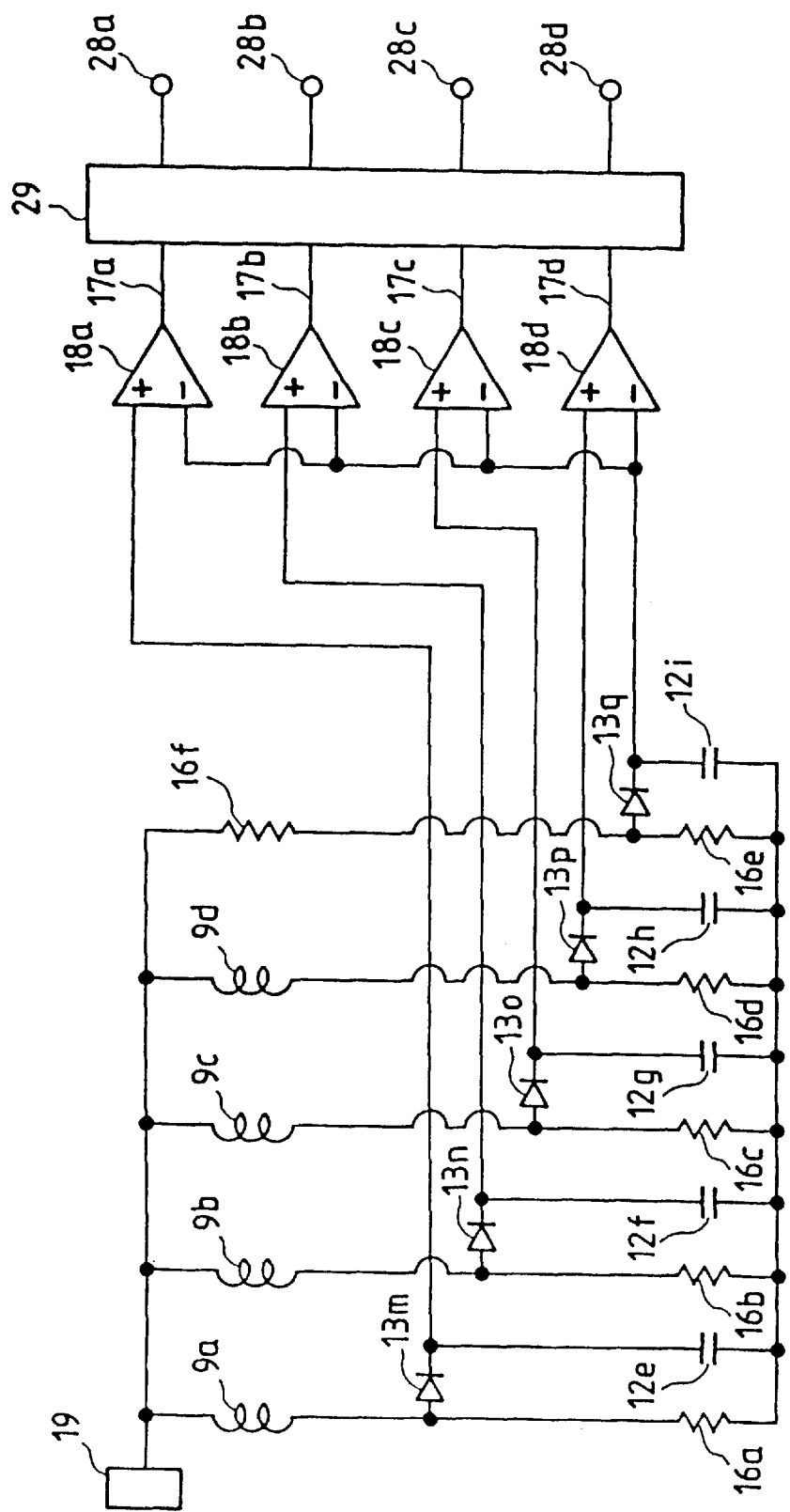
FIG. 4 is a diagram of a circuit for obtaining power-supply signals from position detection signals from coils of position detecting elements.

Referring now to FIG. 4, there will be described means for obtaining position detection signals and power-supply signals from the position detecting coils 9a, 9b, 9c and 9d that face the salients 8a and 8b of the position detecting rotor 8.

In FIG. 4, the position detecting coils 9a, 9b, 9c and 9d and a resistor 16f, and resistors 16a, 16b, 16c, 16d and 16d constitute a bridge circuit. This bridge circuit is adjusted so as to be in equilibrium when the position detecting coils 9a, 9b, 9c and 9d are not confronting the salients 8a and 8b of the position detecting rotor 8. Numeral 19 denotes an oscillator circuit, which oscillates at 1 megacycle or thereabouts.

Thus, when position detecting coil 9a faces neither of the salients 8a and 8b of the position detecting rotor 8, the output of a low-pass filter, which is composed of a diode 13m and a capacitor 12e, becomes equivalent to a voltage resulting by being divided by the resistors 16f and 16e and-smoothed by a diode 13q and a capacitor 12i. As a result, the output of an operational amplifier 18a becomes low. When the position detecting coil 9a faces either of the salients 8a and 8b of the position detecting rotor 8, on the other hand, the impedance of the position detecting coil 9a is reduced by an eddy current loss, so that a voltage drop of the resistor 16a increases. As a result, an input to the positive terminal of the operational amplifier 18a surpasses an input to the negative terminal, so that a high-level output can be obtained from an output terminal 17a of the operational amplifier 18a. The above description a relating to the position detecting coil 9a is also applicable to the other position detecting coils 9b, 9c and 9d, and similar outputs are obtained from output terminals 17b, 17c and 17d of the operational amplifiers 18b, 18c and 18d.

As described above, the output signals from the output terminals 17a, 17b, 17c and 17d of the operational amplifiers 18a, 18b, 18c and 18d are position detection signals. When the rotor 1 rotates in the direction of arrow R in FIGS. 1 and 2, the position detection signals can be represented by upper four time charts (range P) in FIG. 5. More specifically, the position detection signals are delivered individually as curves 20a, 20b, . . . from the output terminal 17a of the operational amplifier 18a, curves 21a, 21b, . . . from the output terminal 17b of the operational amplifier 18b, curves 22a, 22b, . . . from the output terminal 17c of the operational amplifier 18c, and curves 23a, 23b, from the output terminal 17d of the operational amplifier 18d. These position detection signals have a width equivalent to an electrical angle of 225° each and are separated at intervals corresponding to electrical angles of 135°. Also, there are phase differences of 90° in terms of electrical angles between the curves 20a and 21a, between the curves 21a and 22a, between the curves 22a and 23a, between the curves 23a and 20b, . . . individually.

The signals from the output terminals 17a, 17b, 17c and 17d of the operational amplifiers 18a, 18b, 18c and 18d are inputted to a power-supply signal circuit 29 which uses AND circuits. As a result, output curves represented by lower four time charts (range Q) in FIG. E are obtained from output terminals 28a, 28b, 28c and 28d of the power-supply signal circuit 29. More specifically, curves 24a, 24b, . . . are delivered from the output terminal 28a of the power-supply signal circuit 29, curves 25a, 26b, . . . from the output terminal 28b, curves 26a, 26b, . . . from the output terminal 28c, and curves 27a, 27b, . . . from the output terminal 28d. These curves have a width equivalent to an electrical angle of 180° each and are separated at intervals corresponding to electrical angles of 180°. Also, there are phase differences of 90° in terms of electrical angles between the curves 24a and 25a, between the curves 25a and 26a, between the curves 26a and 27a, between the curves 27a and 24b, . . . individually, and therefore, the curves overlap one another for the width equivalent to the electrical angle of 90°.

The output signals (curves 24a, 24b, . . . ) from the output terminal 28a of the power-supply signal circuit 29 are applied to a first input terminal 15a of the power-supply control circuit of FIG. 3, the output signals (curves 25a, 25b, . . . ) from the output terminal 28b are applied to a second input terminal 15b, the output signals (curves 26a, 26b, . . . ) from the output terminal 28c are applied to a third input terminal 15c, and the output signals (curves 27a, 27b, . . . ) from the output terminal 28d are applied to a fourth input terminal 15d.

The following is a description of the operation of this reluctance motor.

Figure 7:
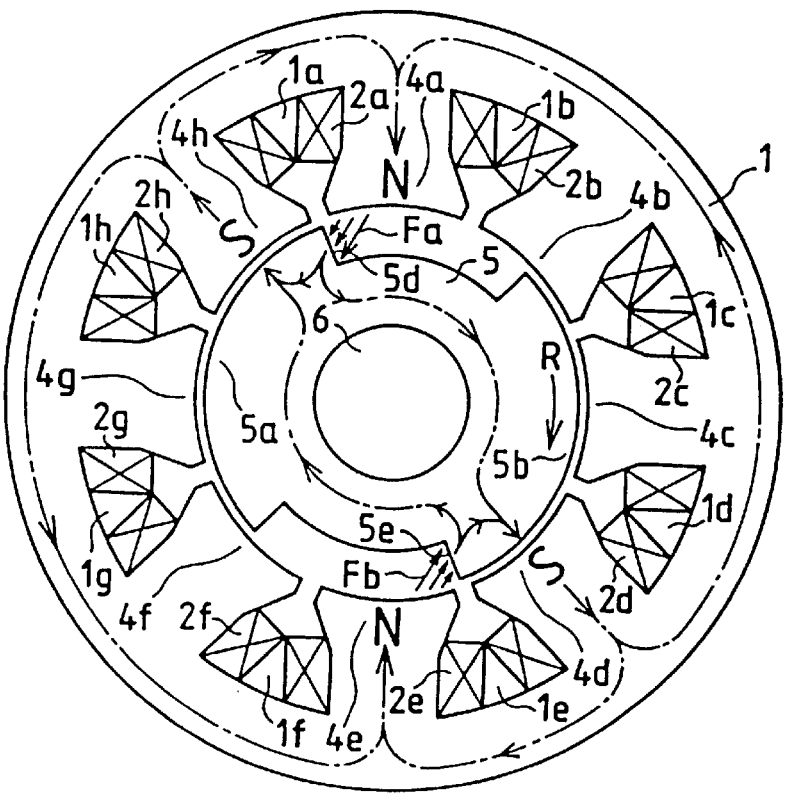
FIG. 7 is a diagram illustrating magnetic fluxes to be generated when power supplying to a first-phase exciting coil is started while power is being supplied to a fourth-phase exciting coil, when the rotor of the motor of FIG. 1 is rotated in the direction of arrow R in FIG. 1.

In rotating the rotor 5 in the direction indicated by arrow R in FIGS. 1 and 7, the power-supply signal 24b is applied to the first input terminal 15a of the power-supply control circuit of FIG. 3 to turn on the switching elements 11a and 11e, thereby energizing the first-phase exciting coil 3a, when the rotating-direction-side end portion 5d of the salient pole 5a and the rotating-direction-side end portion 5e of the salient pole 5b are situated corresponding to the center of the slot 1a of the stator armature 1 and the center of the slot 1e, respectively, as shown in FIGS. 1 and 7. Thereupon, as shown in FIG. 7, leakage fluxes Fa and Fb are generated between the magnetic pole 4a and the end portion 5d of the salient pole 5a and between the magnetic pole 4e and the end portion 5e of the salient pole 5b, respectively. As a result, the salient poles 5a and 5b are attracted toward the magnetic poles 4a and 4e by these leakage fluxes Fa and Fb, whereupon the rotor 5 rotates in the direction of arrow R.

In this case, since the power-supply signal 27a is already applied to the fourth input terminal 15d of the power-supply control circuit, the switching elements 11c and 11h are turned on, so that the fourth-phase exciting coil 3d is energized. Accordingly, passing through the magnetic pole 4a that produces torque are, as indicated by curves with arrows in FIG. 7, a magnetic flux generated by energizing the armature coil 2a of the magnetic pole 4a, half of a magnetic flux generated by energizing the armature coil 2h of the magnetic pole 4h that produces no torque, and half of a magnetic flux generated by energizing the armature coil 2d of the magnetic pole 4d that produces no torque. At the same time, passing through the magnetic pole 4e that produces torque are, as indicated by curves with arrows in FIG. 7, a magnetic flux generated by energizing the armature coil 2e of the magnetic pole 4e, half of a magnetic flux generated by energizing the armature coil 2d of the magnetic pole 4d that produces no torque, and half of a magnetic flux generated by energizing the armature coil 2h of the magnetic pole 4h that, produces no torque.

In this reluctance motor, as described above, the magnetic fluxes generated by energizing the armature coils 2h and 2d of the magnetic poles 4h and 4d that are situated so as not to produce any torque are added to the magnetic fluxes generated by energizing the armature coils 2a and 2e of the magnetic poles 4a and 4e that are situated so as to produce torque in a specific direction (direction indicated by arrow R in FIG. 7), so that the magnetic fluxes that pass through the magnetic poles 4a and 4e situated so as to produce torque are doubled. In consequence, the leakage fluxes Fa and Fb between the magnetic poles 4a and 4e and the salient poles 5a and 5b of the rotor 5 increase, causing the torque to increase.

Figure 8:
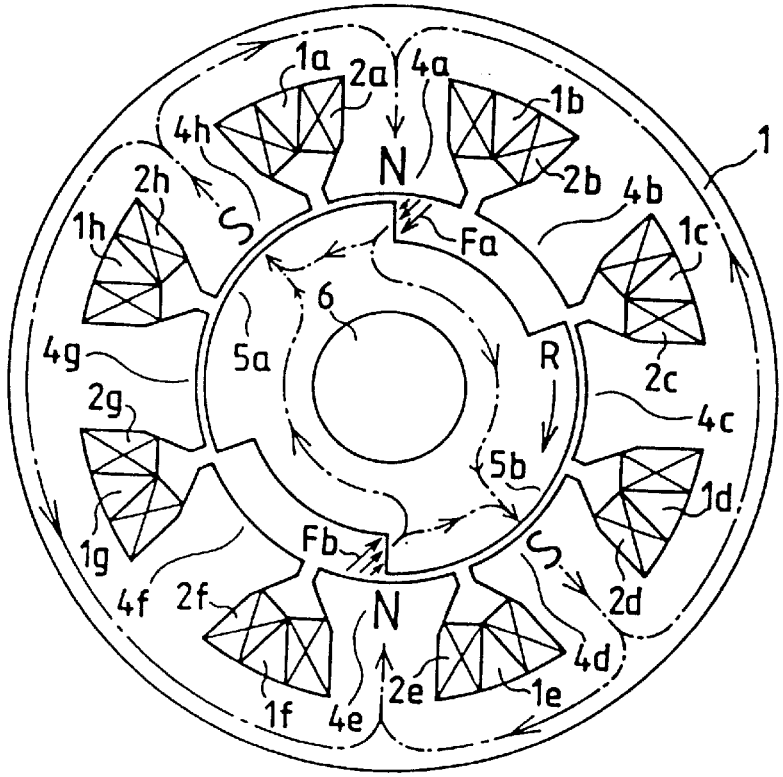
FIG. 8 is a diagram illustrating magnetic fluxes generated when the rotor of the motor of FIG. 1 is rotated to the middle of a first phase in the direction of arrow R in FIG. 1.

The state shown in FIG. 8 is established when the rotor 5 is caused by the leakage fluxes Fa and Fb to rotate further through an electrical angle of 45° in the direction of arrow R in FIG. 7 from the rotational position of FIG. 7. Since the magnetic fluxes passing through the magnetic poles 4a and 4e are not changed yet (both power-supply signals 24b and 27a are still in a high-level period) in this position, the leakage fluxes Fa and Fb are generated between the magnetic poles 4a and 4e and the salient poles 5a and 5b of the rotor 5, as shown in FIG. 8, so that the torque is maintained, and the rotor 5 continues to be rotated in the same direction.

Figure 9:
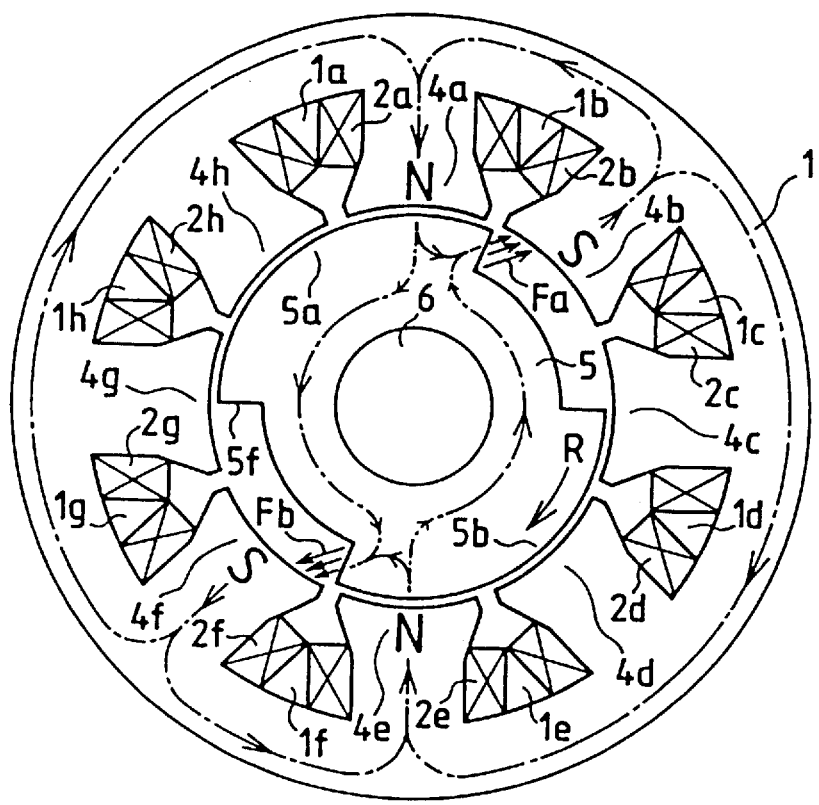
FIG. 9 is a diagram illustrating magnetic fluxes to be generated when power supply to the fourth-phase exciting coil is discontinued and the rotor of the motor of FIG. 1 is rotated in the direction of arrow R in FIG. 1, and power supplying to a second-phase exciting coil is started while power is being supplied to the first-phase exciting coil.

When the rotor 5 rotates through an electrical angle of 90° from the position of FIG. 7 (or through an electrical angle of 45° from the position of FIG. 8), the rotating-direction-side end portion 5b of the salient pole 5a is situated corresponding to the center of the slot 1b of the stator armature 1, and at the same time, the rotating-direction-side end portion 5e of the salient pole 5b is situated corresponding to the slot if, as shown in FIG. 9.

When the rotor 5 is in the position shown in FIG. 9, the power-supply signal 27a is cut off from the fourth input terminal 15d of the power-supply control circuit, so that the switching elements 11d and 11h are turned off, and the fourth-phase-exciting coil 3d is de-energized. As a result, the magnetic fluxes passing through the salient poles 4d and 4h disappear. The width of the salient poles 5a and 5b is equivalent to an electrical angle of 225°, while the width of the salient, poles 4a to 4h is equivalent to an electrical angle of 90°. If the rotating-direction end portion 5d of the salient pole 5a is at the boundary between the salient poles 4a and 4b, as shown in FIG. 9, therefore, the end portion 5f of the salient pole 5a on the side opposite from the rotating direction is situated corresponding to the center of the magnetic pole 4g (90+90+90/2=225). The same applies to the case of the salient pole 5b. In consequence, the salient poles 5a and 5b continue to face the magnetic poles 4h and 4d until the rotor 5 rotates further through an electrical angle of 45° in the direction of arrow R from the position of FIG. 9. Accordingly, the salient poles 5a and 5b keep on facing the magnetic poles 4h and 4d until the magnetic fluxes derived from inductances in the magnetic poles 4d and 4h disappear after the exciting coil 3d is de-energized in the position of FIG. 9, so that no antitorque is produced.

The moment the exciting coil 3d is de-energized (signal 27a goes low), the power-supply signal 25b is applied to the second input terminal 15b of the power-supply control circuit, causing the switching elements 11b and 11f to be turned on, whereupon the second-phase exciting coil 3b is energized. In consequence, the leakage fluxes Fa and Fb are generated between the magnetic pole 4b and 4f and the salients 5a and 5b of the rotor 5, as shown in FIG. 9, and the salients 5a and 5b are attracted toward the magnetic poles 4b and 4f, causing the rotor 5 to continue to be rotated in the same direction.

In this case, since the power-supply signal 24b is still being applied to the first input terminal 15a of the power-supply control circuit at this point of time, the first-phase exciting coil 3a continues to be energized. Accordingly, passing through the magnetic pole 4b that produces torque are, as indicated by curves with arrows in FIG. 9, a magnetic flux generated by energizing the armature coil 2b of the magnetic pole 4b, half of a magnetic flux generated by energizing the armature coil 2a of the magnetic pole 4a that produces no torque, and half of a magnetic flux generated by energizing the armature coil 2e of the magnetic pole 4e that produces no torque. At the same time, passing through the magnetic pole 4f that produces torque are, as indicated by curves with arrows in FIG. 9, a magnetic flux generated by energizing the armature coil 2f of the magnetic pole 4f, half of a magnetic flux generated by energizing the armature coil 2e of the magnetic pole 4e that produces no torque, and half of a magnetic flux generated by energizing the armature coil 2a of the magnetic pole 4a that produces no torque.

Accordingly, the magnetic fluxes generated by energizing the armature coils 2a and 2e of the magnetic poles 4a and 4e that are situated so as not to produce any torque are added to the magnetic fluxes generated by energizing the armature coils 2b and 2f of the magnetic poles 4b and 4f that are situated so as to produce torque in the direction indicated by arrow R in FIG. 9, so that the magnetic fluxes that pass through the magnetic poles 4b and 4f situated so as to produce torque are doubled. In consequence, the leakage fluxes Fa and Fb between the magnetic poles 4b and 4f and the salients 5a and 5b of the rotor 5 increase, causing the torque to increase.

As described in the foregoing, the rotor 5 is rotated through an electrical angle of 90° or mechanical angle of 45°, from the position of FIG. 7 to the position of FIG.9. Then, the exciting coil for each phase is repeatedly energized in the same manner as described in, the foregoing, causing the rotor 5 to continue to rotate in the direction of arrow R.

While the foregoing explanation is concerned with the case in which the rotor 5 rotates in the direction indicated by arrow R in FIGS. 2 and 7 to 9 has been described above, the following is a description of a case in which the rotor 5 is rotated in the direction opposite to the aforesaid direction.

Figure 6:
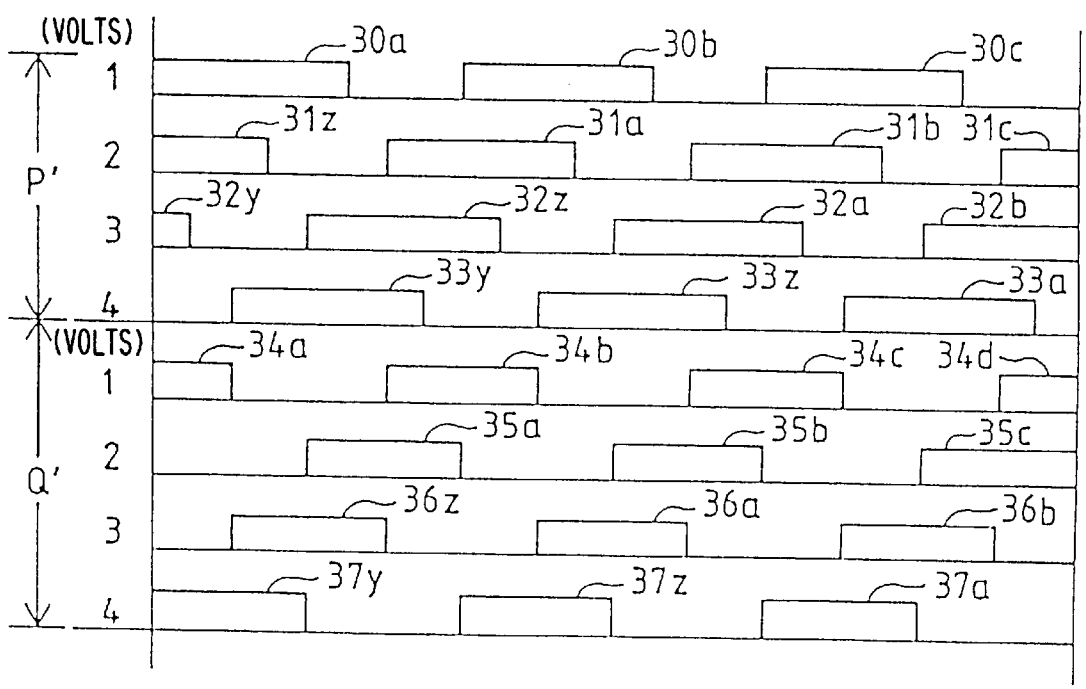
FIG. 6 is a time charts showing position detection signal curves and power-supply signal curves obtained by means of the circuit of FIG. 4 when the rotor of the motor of FIG. 1 is rotated in the direction opposite to the direction of arrow R in FIG. 1.

The position detection signals are obtained in the form shown by upper four lines (range P') of time charts in FIG. 6. More specifically, the position detection signals are delivered individually as curves 30a, 30b, . . . from the output terminal 17a of the operational amplifier 18a, curves 31a, 31b, . . . from the output terminal 17b of the operational amplifier 18b, curves 32a, 32b, . . . from the output terminal 17c of the operational amplifier 18c, and curves 33a, 33b, . . . from the output terminal 17d of the operational amplifier 18d.

Also, output curves represented by lower four time charts (range Q') in FIG. 6 are obtained from the output terminals 28a, 28b, 28c and 28d of the power-supply signal circuit 29. More specifically, curves 34a, 34b, . . . are delivered from the output terminal 28a of the power-supply signal circuit 29, curves 35a, 35b, . . . from the output terminal 28b, curves 36a, 36b, . . . from the output terminal 28c, and curves 37a, 37b, . . . from the output terminal 28d.

The output signals (curves 34a, 34b, . . . ) from the output terminal 28a of the power-supply signal circuit 29 are applied to the first input terminal 15a of the power-supply control circuit of FIG. 3; the output signals (curves 35a, 35b, . . . ) from the output terminal 28b are applied to the second input terminal 15b; the output signals (curves 36a, 36b, . . . ) from the output terminal 28c are applied to the third input terminal 15c; and the output signals (curves 37a, 37b, . . . ) from the output terminal 28d are applied to the fourth input terminal 15d. As a result, the rotor 5 rotates in the direction opposite to the direction indicated by arrow R. The description of the operating principle for this reverse rotation is omitted, because it is similar to that in the case where the rotor 5 rotates in the direction indicated by arrow R, as described before with reference to FIGS. 7 to 9.

In the four-phase reluctance motor according to the present embodiment, as stated above, the inner peripheral surface of the stator armature 1 is provided with eight slots (and hence eight magnetic poles), while the magnetic rotor 5 is provided with two salient poles. However, the reluctance motor according to the present invention, is not limited to the four-phase version. For example, an eight-phase reluctance motor may be constructed by providing the inner peripheral surface of the stator armature 1 and the magnetic rotor 5 with sixteen slots (and hence sixteen magnetic poles) and four salient poles, respectively.

In more general terms, the reluctance motor according to the present invention comprises 8n units (n is an integer of 1 or more) of slots arranged in the inner peripheral surface of a cylindrical magnetic stator armature, at regular intervals of 90 degrees in terms of electrical angles, 8n units of armature coils wound individually in the adjacent slots to form 8n units of magnetic poles, 2n units of salient poles arranged on the outer peripheral surface of a magnetic rotor, with a width ranging from an electrical angle of 180 degrees to 270 degrees and at intervals ranging from electrical angles of 90 degrees to 180 degrees, means for holding the 2n units of salient poles so as to face the inner peripheral surface of the stator armature through narrow air gaps, individually, a device for detecting the respective rotational positions of the salient poles with respect to each slot and obtaining 4n-phase position detection signals continuous with one another having a width equivalent to an electrical angle of 90°, 4n-phase exciting coils formed by connecting the diametrically opposite armature coils in series or parallel with one another, semiconductor switching elements connected in series with the 4n-phase exciting coils, and a power-supply control circuit designed so that the 4n-phase exciting coils are energized by turning on the semiconductor switching elements, connected in series with the 4n-phase exciting coils by the 4n-phase position detection signals having a width equivalent to an electrical angle of 180 from the position detection signals.

As described above, the reluctance motor according to the present invention has an advantage of being capable of providing increased torque without increasing its body size or improving machining accuracy in manufacturing.

I claim:

1. A reluctance motor comprising:

a magnetic stator formed with 8n units (where n is an integer greater than or equal to 1) of slots disposed in the inner peripheral surface thereof at regular angular intervals of 90 degrees in terms of electrical angles;

8n units of magnetic poles formed by winding armature coils individually between the adjacent slots in said magnetic stator;

a magnetic rotor formed with 2n units of salient poles disposed on the outer peripheral surface thereof and having a width of an electrical angle of 270 degrees and at intervals ranging from electrical angles of 90 degrees to 180 degrees;

means for holding said magnetic rotor relatively to said stator so that the respective outer peripheral surfaces of the 2n units of salient poles of said magnetic rotor and inner peripheral surface of said stator confront one another across narrow air gaps;

rotational position detecting means for detecting the respective rotational positions of the salient poles of the rotor with respect to each slot of said stator;

a power-supply signal generator for generating 4n sets of phase power-supply signals based on rotational position signals from said rotational position detecting means so that power-supply signals in one phase overlap power-supply signals in another phase by electrical angles of 90°;

4n units of phase exciting coils formed by connecting the armature coils of each diametrically opposite salient poles, out of said 8n units of salient poles, in series or parallel with each other; and a power-supply control circuit designed so that semiconductor switching elements are connected individually in series with said 4n units of phase exciting coils, and that the exciting coils for each phase are energized one after another by turning on the semiconductor switching elements corresponding to the exciting coils for the phase concerned by a width equivalent to an electrical angle of 180°, in response to the power-supply signals of each phase delivered from said power-supply signal generator.

2. A reluctance motor according to claim 1, wherein said rotational position detecting means includes a cylindrical position detecting rotor, fixed to the rotating shaft of the magnetic rotor and formed on the outer periphery thereof, with salients having the same width as the salient poles of the magnetic rotor, and position detecting coils fixed to a frame of the motor in positions at which the position detecting coils can confront face the salients of the position detecting rotor.

* * * * *

UNITED STATES PATENT AND TRADEMARK OFFICE
CERTIFICATE OF CORRECTION

PATENT NO. : 5,828,154

DATED : October 27, 1998

INVENTOR(S) : Bahn

It is certified that error appears in the above-identified patent and that said Letters Patent is hereby corrected as shown below:

```
Title Page [57] ABSTRACT, line 11, "at-positions" should be
                --at positions--.

Col. 2,   line 22, "aft" should be --at--.

Col. 3,   line 36, "1b, 1h" should be --1b,...1h--;
                   "t he" should be --the--.

Figure 5:
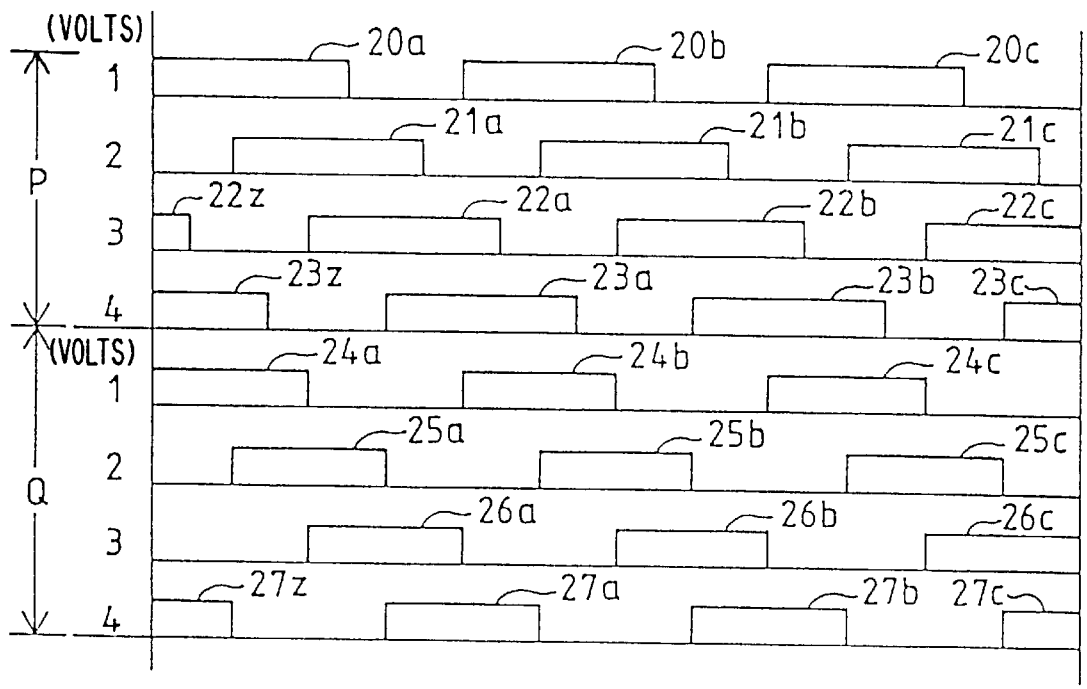
FIG. 5 is a time charts showing position detection signal curves and power-supply signal curves obtained by means of the circuit of FIG. 4 when the rotor of the motor of FIG. 1 is rotated in the direction of arrow R in FIG. 1.

Col. 5,   line 14, "and-smoothed" should be --and smoothed--;
          line 24, delete "a";
          line 53, "FIG E" should be --FIG. 5--.

Col. 6,   line 49, after "that" delete ",".

Col. 8,   line 66, after "invention" delete ",".

Col. 9,   line 30, "180" should be --180°--.
```

Signed and Sealed this

Second Day of March, 1999

Attest:

Q. TODD DICKINSON

*Attesting Officer*     *Acting Commissioner of Patents and Trademarks*